(12) United States Patent
Rigney et al.

(10) Patent No.: US 8,516,882 B2
(45) Date of Patent: Aug. 27, 2013

(54) TIRE PRESSURE MONITORING APPARATUSES, SYSTEMS AND METHODS

(75) Inventors: Brian P. Rigney, Raleigh, NC (US); Larry Schlesinger, Bahama, NC (US); Miguel B. Cavas, Raleigh, NC (US)

(73) Assignee: Dill Air Controls Products, LLC, Oxford, NC (US)

( * ) Notice: Subject to any disclaimer, the term of this patent is extended or adjusted under 35 U.S.C. 154(b) by 42 days.

(21) Appl. No.: 13/296,805

(22) Filed: Nov. 15, 2011

(65) Prior Publication Data

US 2012/0118057 A1    May 17, 2012

Related U.S. Application Data

(60) Provisional application No. 61/456,934, filed on Nov. 15, 2010.

(51) Int. Cl.
*B60C 23/02*    (2006.01)

(52) U.S. Cl.
USPC ........................................... 73/146.8

(58) Field of Classification Search
USPC ................................. 73/146–146.8
See application file for complete search history.

(56) References Cited

U.S. PATENT DOCUMENTS

| | | | |
|---|---|---|---|
| 5,172,720 A | 12/1992 | Richards | |
| 5,844,131 A | 12/1998 | Gabelmann et al. | |
| 6,167,900 B1 * | 1/2001 | Laird | 137/227 |
| 6,362,731 B1 | 3/2002 | Lill | |
| 6,557,406 B2 | 5/2003 | Gabelmann | |
| 6,722,409 B1 | 4/2004 | Martin | |
| 7,444,860 B1 | 11/2008 | Poparad | |
| 7,518,495 B2 | 4/2009 | Tang et al. | |
| 7,565,832 B2 * | 7/2009 | Huang | 73/146.8 |
| 8,365,590 B2 * | 2/2013 | Yu et al. | 73/146.5 |
| 2002/0046599 A1 * | 4/2002 | Chuang et al. | 73/146 |
| 2006/0272402 A1 * | 12/2006 | Yin et al. | 73/146.8 |
| 2007/0295076 A1 | 12/2007 | Blossfeld et al. | |
| 2008/0121031 A1 * | 5/2008 | Huang | 73/146.4 |
| 2008/0276995 A1 * | 11/2008 | Ray et al. | 137/227 |
| 2010/0024539 A1 * | 2/2010 | Hamm et al. | 73/146.5 |
| 2012/0118057 A1 * | 5/2012 | Rigney et al. | 73/146.8 |
| 2012/0137763 A1 * | 6/2012 | Falkenborg | 73/146.8 |
| 2012/0222477 A1 * | 9/2012 | Yu et al. | 73/146 |

* cited by examiner

*Primary Examiner* — Andre Allen
(74) *Attorney, Agent, or Firm* — Jenkins, Wilson, Taylor & Hunt, P.A.

(57) ABSTRACT

Tire pressure monitoring apparatuses, systems and method for adapting a tire pressure monitoring apparatus to be used with a plurality of valve stem configurations. Tire pressure monitoring transducers and sensors designed for use with a single valve stem design can be modified to universally accept a plurality of valve stems when coupled with the presently disclosed adapter. Use of an adapter of the presently disclosed subject matter can adapt a tire pressure monitoring apparatus such that it is suitable for use with a wide range of existing valve stems, including valve stems not originally designed to be used with the tire pressure monitoring apparatus. The adapter is suitable for use with tire pressure monitoring transducers and sensors.

21 Claims, 10 Drawing Sheets

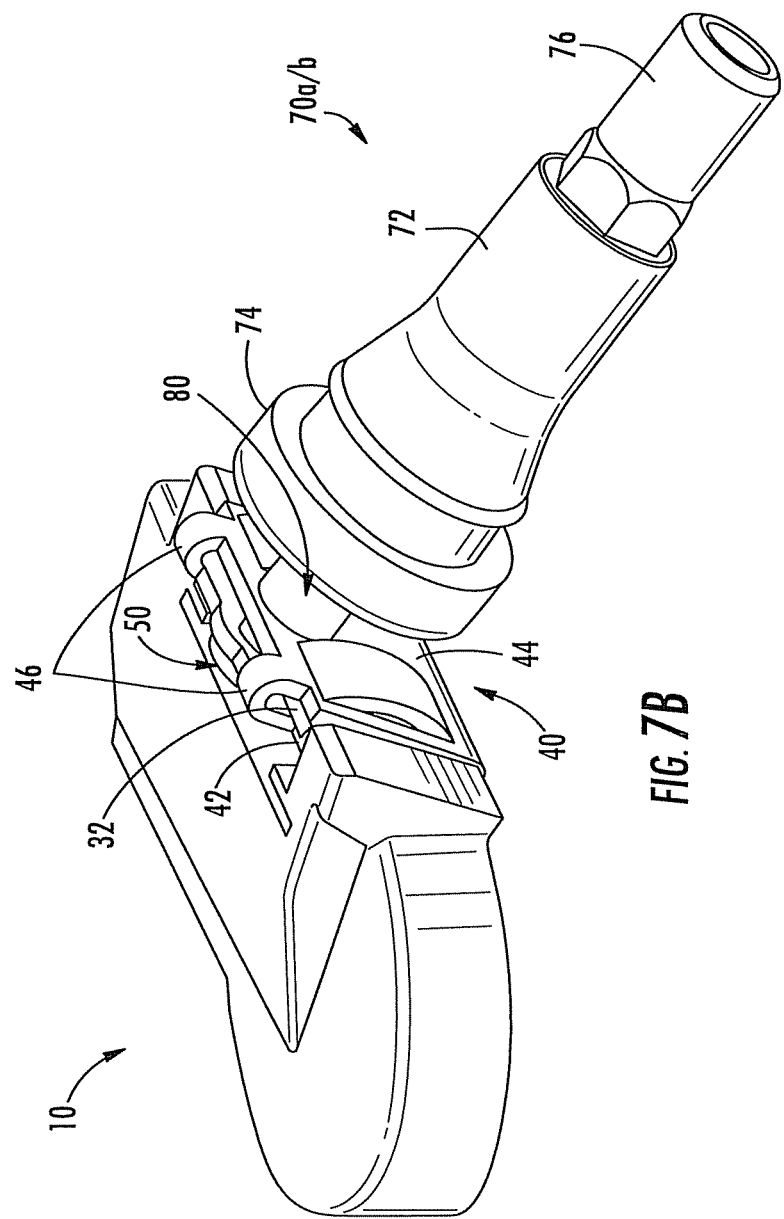

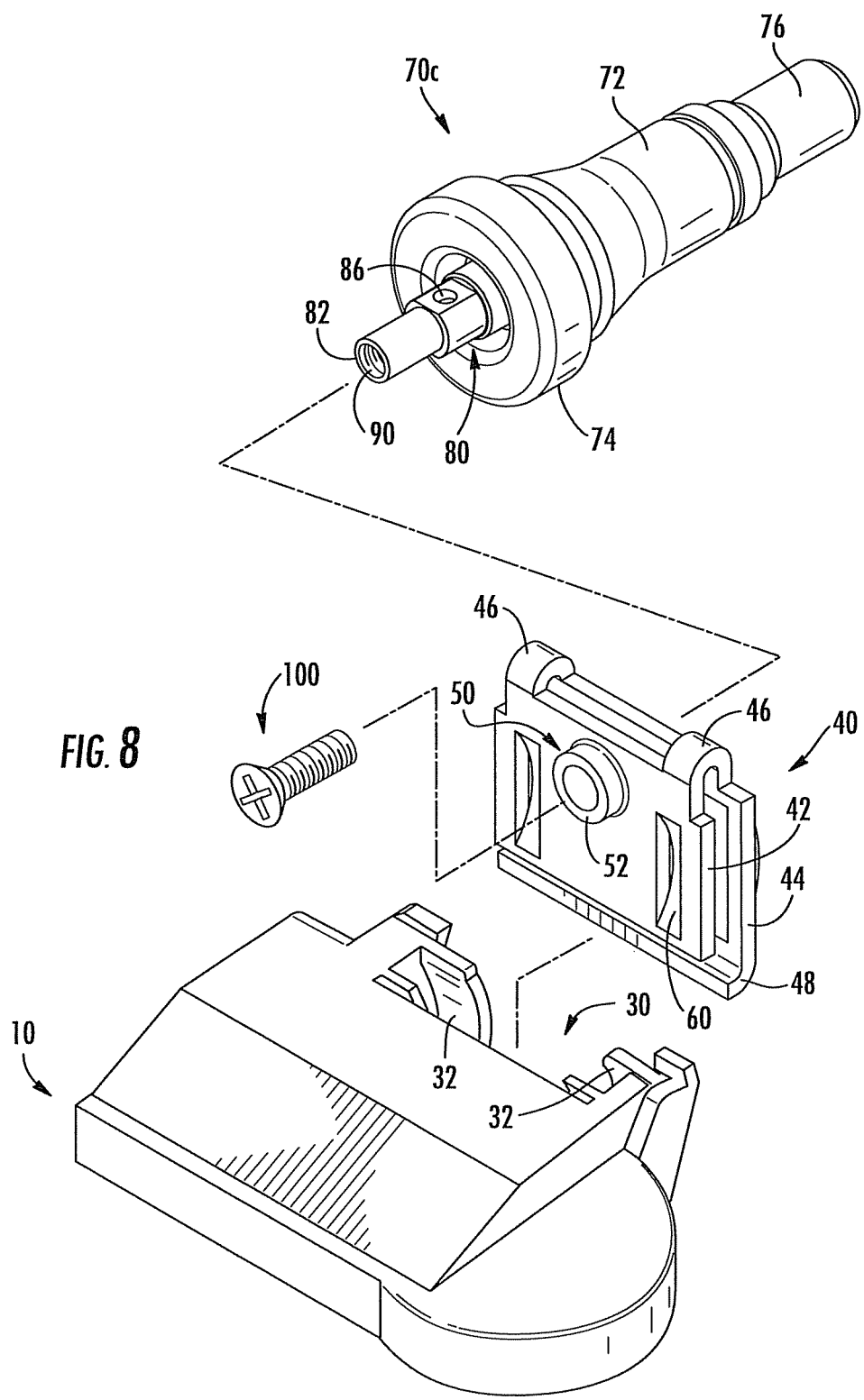

TIRE PRESSURE MONITORING APPARATUSES, SYSTEMS AND METHODS

CROSS REFERENCE TO RELATED APPLICATION

This application claims the benefit of and priority to U.S. Provisional Patent Application Ser. No. 61/456,934, filed Nov. 15, 2010, the disclosure of which is incorporated herein by reference in its entirety.

TECHNICAL FIELD

This presently disclosed subject matter relates to tire pressure monitoring (TPM) apparatuses, systems and methods. More particularly, the presently disclosed subject matter relates to an adapter with features that facilitate the use of the adapter with an existing TPM transducer to adapt the TPM transducer for use with various valve stems and vehicle wheel configurations.

BACKGROUND

Many types of vehicles and automobiles use pressurized rubber tires. Air pressure, as well as temperature, within tires used on vehicles can impact performance and safety. As such, a need exists for systems and methods for monitoring the pressure, and in some instances temperature, of tires on vehicles.

It is known to equip automobile tires with mechanisms to indicate tire pressure. Tire pressure monitoring (TPM) systems are known in the art, and can include tire pressure sensors that communicate the tire pressure information to a vehicle operator via tuned circuits and radio transmitters. The tire pressure sensors of TPM systems are typically mounted as a component of the tire air valve stem and transmit pressure readings at predetermined time intervals using radio frequency, directly to a centralized tire pressure monitoring receiver.

The automotive industry is focusing on reducing the number of part numbers used for vehicle assembly. The industry is also attempting to reduce labor in plants and cost from suppliers for purchased assemblies. TPM sensors are rapidly becoming a commodity, and OEMs are attempting to use one part for multiple platform applications with simplified assembly while maintaining current assembly processes. The challenge for the TPM transducer is adapting a single TPM transducer such that it is suitable for use with a wide range of existing valve stems.

Thus, there is a need for a universal adapter that enables the use of a plurality of valve stem designs and configurations with existing TPM sensors.

SUMMARY

It is an object of the presently disclosed subject matter to provide novel tire pressure monitoring (TPM) apparatuses, systems and methods. This and others objects are achieved in whole or in part by the presently disclosed subject matter.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

FIG. 1A is a perspective view of the TPM transducer and valve stem prior to assembly. FIG. 1B is a perspective view of an assembled TPM transducer and valve stem.

FIG. 2A is a top view of the adapter. FIG. 2B is a rear view of the adapter. FIG. 2C is a perspective view of the adapter. FIG. 2D is a side view of the adapter. FIG. 2E is a front view of the adapter.

FIGS. 3A, 3B and 3C are perspective, bottom and cross-sectional views, respectively.

FIGS. 4A, 4B and 4C are perspective, bottom and cross-sectional views, respectively.

FIGS. 5A, 5B and 5C are perspective, bottom and cross-sectional views, respectively.

FIG. 6A is a perspective view of the TPM transducer and adapter prior to assembly. FIG. 6B is a perspective view of the TPM transducer and adapter after assembly. FIG. 6C is a top view of the TPM transducer and adapter after assembly. FIG. 6D is a side view of the TPM transducer and adapter after assembly.

FIGS. 7A and 7B are illustrations of a TPM transducer, valve stem and an adapter of the presently disclosed subject matter designed to adapt the TPM transducer for use with the valve stem. FIG. 7A is a perspective view of a TPM transducer, valve stem and an adapter of the presently disclosed subject matter prior to assembly. FIG. 7B is a perspective view of a TPM transducer, valve stem and an adapter of the presently disclosed subject matter after assembly.

FIG. 8 is an exploded view of a TPM transducer, a valve stem with a core element having an internally threaded end, an adapter of the presently disclosed subject matter designed to adapt the TPM transducer for use with the valve stem, and a screw for securing the valve stem to the adapter.

DETAILED DESCRIPTION

Figure 1A:
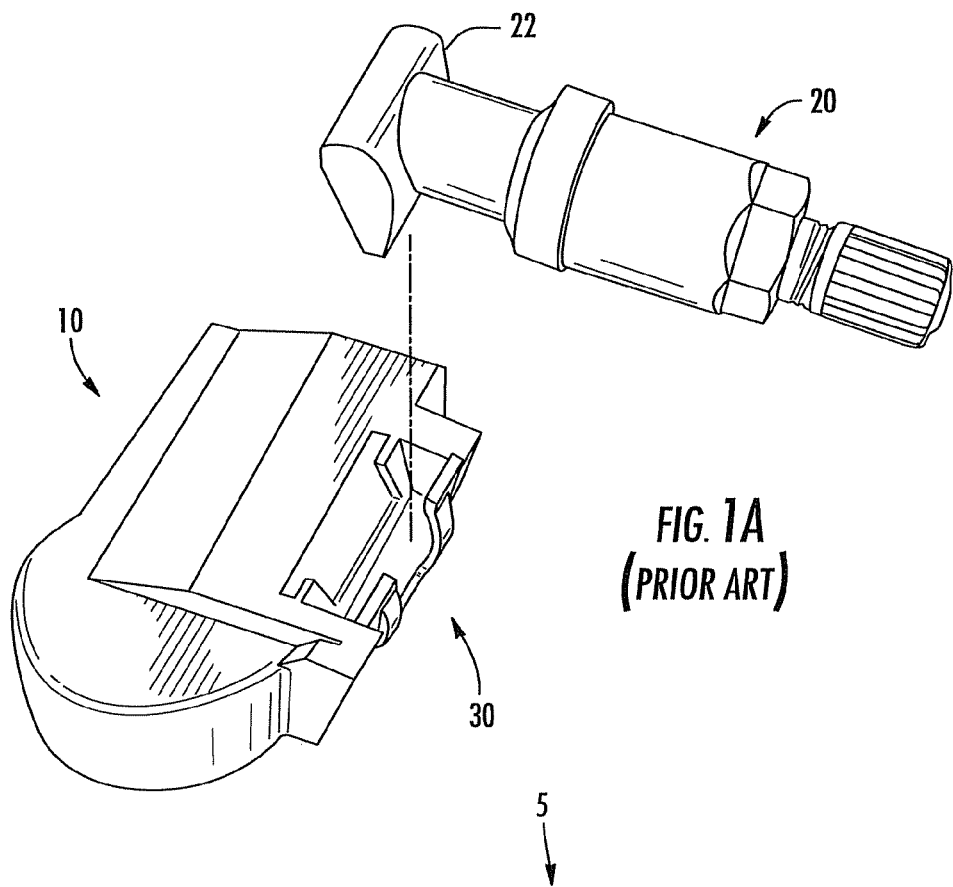
FIGS. 1A and 1B are illustrations of a prior art tire pressure monitoring (TPM) assembly comprising a TPM transducer and accompanying valve stem.

The presently disclosed subject matter relates to tire pressure monitoring (TPM) apparatuses, systems and methods. In some embodiments, the presently disclosed subject matter relates to unitized TPM apparatuses, systems and methods with features that facilitate adaptive combinations of TPM transducers or sensors and valve stems for installation on various vehicle wheel configurations.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a fastener" includes a plurality of such fasteners, and so forth.

Unless otherwise indicated, all numbers expressing quantities, units of measure, and so forth used in the specification and claims are to be understood as being modified in all instances by the terms "about", "approximately" and "substantially". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to a weight, volume, distance, measurement, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate with respect to the disclosed subject matter.

The term "comprising", which is synonymous with "including" "containing" or "characterized by" is inclusive or open-ended and does not exclude additional, unrecited elements or method steps. "Comprising" is a term of art used in claim language which means that named elements are included, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein the terms "tire pressure monitoring", "TPM", "tire pressure monitoring system", "TPMS" and "tire monitoring system" are used interchangeably and refer to a monitoring apparatus and system for monitoring parameters of a tire of a vehicle. In some aspects or embodiments, the tire monitoring systems and methods provide a user, such as an operator of a vehicle, with the ability to monitor the temperature, pressure, and any other suitable property or parameter of a tire. In some aspects, the property or parameter to be monitored is that of the interior of the tire. In some aspects, the tire monitoring systems and methods can indicate to an operator the monitored properties specific to each tire of the vehicle, and the corresponding location of each tire from which the property is monitored. In some aspects, the tire monitoring systems monitor the tire pressure and/or temperature in one or more tires of a vehicle and indicate to the vehicle operator the tire pressure and/or temperature of each tire being monitored.

The presently disclosed subject matter provides tire monitoring apparatuses, systems and methods for monitoring tires in any type of vehicle that uses pressurized and/or pneumatic tires, as would be appreciated by one of ordinary skill in the art. Many types of vehicles, including passenger vehicles and automobiles, commercial vehicles, as well as off-the-road (OTR) vehicles such as loaders, backhoes, graders, trenchers, mining vehicles, construction vehicles, and agricultural vehicles, often use pressurized tires or pneumatic tires. Certain properties of tires in use on a vehicle, such as internal air pressure and temperature, can impact the performance and safety of the vehicle.

II. Tire Pressure Monitoring Apparatus Adapter

Some existing TPM apparatuses and systems comprise a pressure transducer (also referred to as a sensor) with a valve stem connected thereto. Some existing TPM apparatuses comprise a pressure transducer with an aluminum or metal valve stem connected thereto. Unfortunately, pressure transducers designed for aluminum or metal valve stems are not suited for rubber valve stems. Indeed, most pressure transducers are designed to be used with a specific valve stem, e.g. an aluminum or metal valve stem, and are not suited for use with alternative valve stems designs.

The presently disclosed subject matter is directed to TPM apparatuses, systems and methods that allow for the adaptation of various valve stems to existing tire pressure transducers to be used in TPM systems. In some embodiments, the TPM apparatuses, systems and methods can comprise a pressure transducer, a valve stem and an adapter. The valve stem can be designed to be attached to the adapter. The adapter can allow for the attachment of a valve stem to the pressure transducer. In some embodiments, the adapter can allow for the attachment of a rubber valve stem to a pressure transducer designed for an aluminum or metal valve stem.

In some embodiments, the pressure transducer can be designed for use with an aluminum or metal valve stem and can comprise a valve stem bracket for attaching the aluminum or metal valve stem. In some embodiments, the adapter of the presently disclosed subject matter can slidingly engage the valve stem bracket of the pressure transducer and can provide an attachment point for an alternate valve stem such as a rubber valve stem. In some embodiments, the adapter can comprise a threaded receiving port and the rubber valve stem can comprise a threaded core element, wherein the threaded core element of the rubber valve stem can engage the threaded receiving port to thereby attach the rubber valve stem to the adapter. In some embodiments, the adapter can comprise a biasing member that exerts a spring bias on the valve stem bracket of the pressure transducer to maintain engagement between the adapter and the valve stem bracket of the pressure transducer to thereby provide for the secure attachment of the rubber valve stem to the pressure transducer.

The presently disclosed subject matter allows for an existing pressure transducer used in TPM systems and designed for an aluminum or metal valve stem, also referred to herein as a first valve stem or original valve stem, to be adapted for use with a rubber valve stem, also referred to herein as a second valve stem or non-conforming valve stem. The presently disclosed subject matter provides for an existing pressure transducer used in TPM systems to interchangeably use aluminum or metal valve stems and rubber valve stems. That is, the subject matter disclosed herein provides for the adaptation of a TPM apparatus for use with valve stems not originally designed to be used with that TPM apparatus.

Figure 1B:
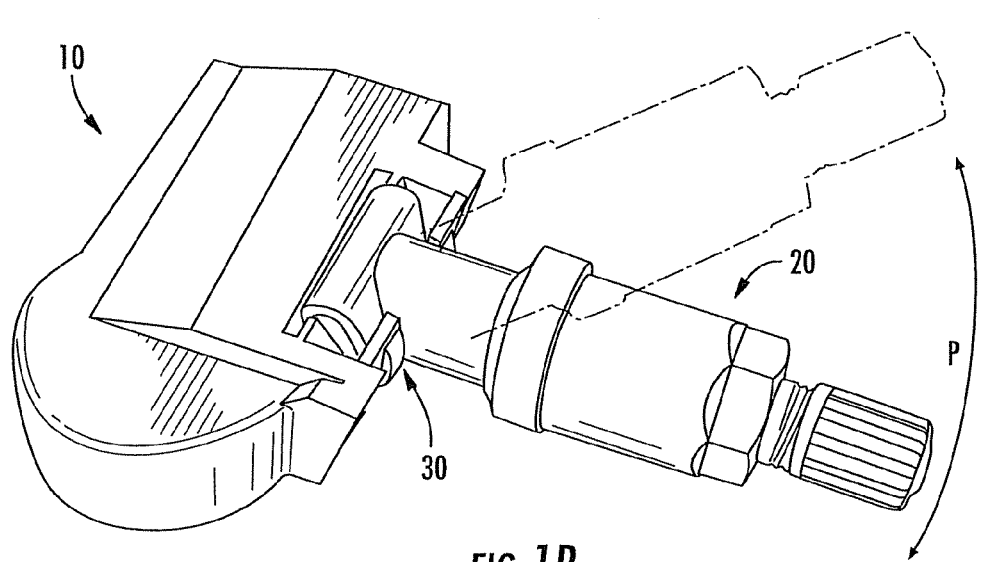

Referring now to FIGS. 1A and 1B, illustrations of a TPM assembly generally designated 5 comprising a TPM transducer 10 and accompanying aluminum or metal valve stem generally designated 20, both of which exist in the art, are provided in views prior to (FIG. 1A) and after (FIG. 1B) assembly.

Further details of an exemplary TPM assembly 5 comprising a TPM transducer generally designated 10 and accompanying aluminum or metal valve stem 20 can be found for example in U.S. Pat. No. 6,557,406. Aluminum or metal valve stem 20 can comprise a base 22 suitable for engaging a valve stem bracket 30 of TPM transducer 10. In some aspects, base 22 of aluminum or metal valve stem 20 is designed to slidingly engage valve stem bracket generally designated 30 of TPM transducer 10 such that aluminum or metal valve stem 20 is securely attached to TPM transducer 10, while allowing aluminum or metal valve stem 20 to pivot, such as in directions indicated by line P on a plane perpendicular to TPM transducer 10. While valve stem bracket 30 of TPM transducer 10 is suitable for use with aluminum or metal valve stem 20 with base 22, as illustrated in FIGS. 1A and 1B, it is not suitable for use with a rubber valve stem commonly used in tire and wheel assemblies on automobiles and other vehicles.

FIGS. 2A, 2B, 2C, 2D and 2E provide illustrations of adapter generally designated 40 designed for use with TPM transducer 10 of FIGS. 1A and 1 B. As used herein, the terms "adapter", "adaptive clip" and "tire pressure monitoring apparatus adapter" are used interchangeably and refer to an apparatus designed to engage a TPM transducer 10 and thereby universally adapt TPM transducer 10 for use with a plurality of valve stem configurations.

The use of adapter 40 with TPM transducer 10 universally adapts TPM transducer 10 for use with a plurality of valve stem configurations. As illustrated in FIGS. 2A through 2E, adapter 40 can comprise a rear panel 42 and front panel 44 joined at the top of each panel by biasing member 46 or members 46. Front panel 42 and rear panel 44 can comprise for example substantially planar rectangular or square structures that can be substantially vertically aligned with respect to one another and spaced apart as illustrated by gap G. As used herein, the terms "front panel", "first panel", "front planar structure" and "first planar structure" are used interchangeably and refer to a first or forward facing substantially planar structure of an adapter 40 of the presently disclosed subject matter. As used herein, the terms "rear panel", "second panel", "rear planar structure" and "second planar structure" are used interchangeably and refer to a second or rear facing substantially planar structure of an adapter 40 of the presently disclosed subject matter.

In some embodiments, biasing member 46 can comprise a continuous or substantially continuous structure joining together the top of each of front panel 44 and rear panel 42. In some embodiments, biasing member 46 can comprise a curved, rounded or semi-circular structure. In some embodiments, biasing member 46 can comprise a plurality of structures joining together the top of each of front panel 44 and rear panel 42, as illustrated in FIGS. 2A through 2E. Biasing member 46 can join together and vertically align front panel 44 and rear panel 42 while maintaining gap G sufficient to slidingly receive valve stem bracket 30 of TPM transducer 10 (illustrated in FIG. 6A and discussed further below). Biasing member 46 can also create a bias that applies pressure to valve stem bracket 30 of TPM transducer 10 so as to secure adapter 40 to valve stem bracket 30 of TPM transducer 10. In some aspects, biasing member 46 can be constructed of or comprise the same material(s) as front panel 44 and rear panel 42. Indeed, in some aspects, biasing member 46, front panel 44 and rear panel 42 can comprise a single unitary piece.

Adapter 40 can further comprise a receiving port 50 suitable for receiving the terminal end 82 of core element 80 of valve stem 70a, 70b or 70c, as illustrated in FIGS. 3A, 3B, 4A, 4B, 5A and 5B and as discussed further below.

In some embodiments, receiving port 50 can comprise a front port 54 on front panel 44 and a rear port 52 on rear panel 42. In some embodiments, receiving port 50, including front port 54 on front panel 44 and rear port 52 on rear panel 42, can comprise a cylindrical opening in front panel 44 and rear panel 42 sufficient to allow for the insertion of the terminal end 82 of core element 80 of a valve stem 70a, 70b or 70c. In some aspects, front port 54 and rear port 52 are aligned such that core element 80 of valve stem 70a, 70b or 70c can pass through both ports. In some aspects, rear port 52 on rear panel 42 can comprise a flange extending perpendicular from the plane of rear panel 42 as illustrated in FIGS. 2C and 2D. Further, in some aspects, rear port 52 and front port 54 can comprise internal threads 56, as illustrated in FIG. 2C, for threadingly receiving the externally threaded 84 terminal end 82 of core element 80 of a valve stem 70a or 70b, as illustrated in FIGS. 3A, 3B, 3C, 4A, 4B and 4C.

Continuing with FIGS. 2A through 2E, in some embodiments adapter 40 can further comprise one or more vertical concave structures 60 on rear panel 42 at or about the sides of rear panel 42. Likewise, in some embodiments adapter 40 can further comprise one or more vertical convex structures 62 on front panel 44 at or about the sides of front panel 44. In some embodiments, vertical concave structures 60 on rear panel 42 and vertical convex structures 62 on front panel 44 are designed to conform to the contours of tabs 32 of valve stem bracket 30 on TPM transducer 10. See FIGS. 6A and 7A, both of which are discussed further below. By conforming to the contours of tabs 32 of valve stem bracket 30 on TPM transducer 10, vertical concave structures 60 and vertical convex structures 62 allow for adapter 40 to slidingly engage valve stem bracket 30 on TPM transducer 10 to thereby serve as an adapter for valve stem 70a, 70b or 70c. In some embodiments, vertical concave structures 60 and vertical convex structures 62 can be indentations in the material of adapter 40 to form the concave and convex structures. Such indentations in the material of adapter 40 to form vertical concave structures 60 and vertical convex structures 62 can be an aspect of the original molded design. In some aspects, vertical concave structures 60 and vertical convex structures 62 can be created in adapter 40 by partially cutting away and distorting the plane of rear panel 42 and front panel 44 to form the concave and convex structures. See FIGS. 2C and 2D. In some embodiments, all or substantially all of the planar surface of rear panel 42 and front panel 44 to can be concave and convex, respectively (not shown).

In some aspects, front panel 44 of adapter 40 can further comprise a lip 48 at the base of front panel 44, as depicted in FIGS. 2C and 2D, wherein lip 48 can conform to and abut against the bottom of TPM transducer 10 once adapter 40 is slidingly engaged to TPM transducer 10. Where adapter 40 is slidingly engaged to TPM transducer 10, lip 48 of adapter 40, abutted against the bottom of TPM transducer 10, can provide a resistive force to prevent adapter 40 from sliding off of valve stem bracket 30 to thereby secure adapter 40 to TPM transducer 10.

Adapter 40 can be constructed from a variety of materials as would be appreciated by one of ordinary skill in the art. By way of example but not limitation, adapter 40 can be constructed of a polymer, plastic or composite material. Alternatively, in some embodiments, adapter 40 can be constructed of a metal or alloy, such as steel, aluminum, brass, or copper. In some embodiments, all or substantially all aspects of adapter 40 can be constructed of the same material. In some embodiments, various aspects of adapter 40 can be constructed of different materials. For example, biasing member 46 can be constructed of a different material than front panel 44 and rear panel 42. Likewise, receiving port 50 can be constructed of a material that differs from that of front panel 44 and rear panel 42. As would be appreciated by one of ordinary skill in the art, other combinations of materials can be used to construct adapter 40 without departing from the scope of the presently disclosed subject matter.

As would be appreciated by one of ordinary skill in the art, adapter 40 can be produced by any suitable manufacturing method. By way of example and not limitation, adapter 40 can be produced by injection molding, stamping from sheets of material, culling and molding, and combinations thereof. In some embodiments, adapter 40 can be produced by stamping from sheets of steel.

Figure 2A:
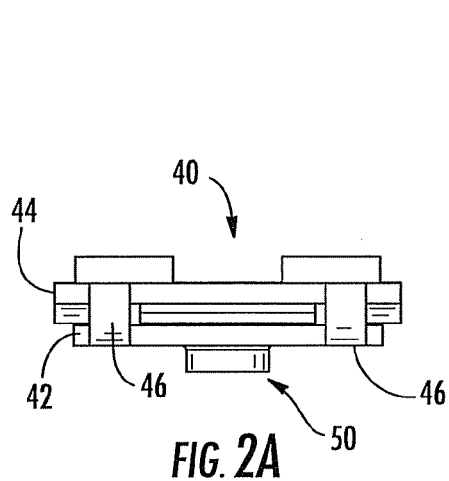
FIGS. 2A, 2B, 2C, 2D and 2E are illustrations of an adapter designed for use with the TPM transducer of FIGS. 1A and 1B to thereby universally adapt the TPM transducer for use with a plurality of valve stem configurations.
Figure 2B:
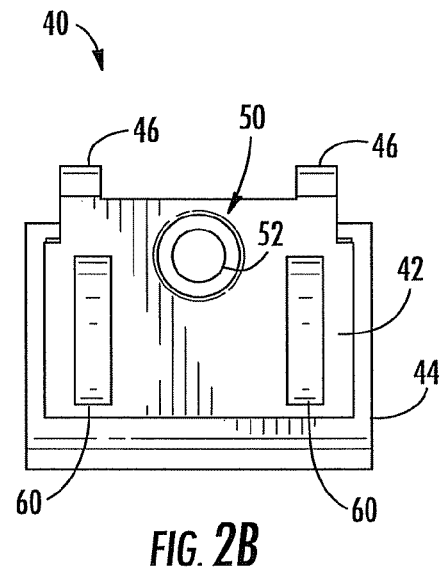
Figure 2C:
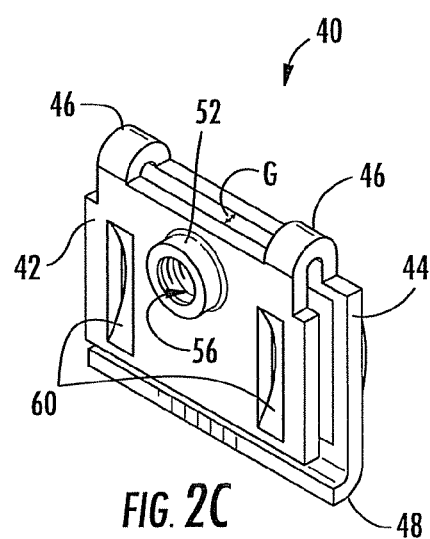
Figures 2D, 2E:
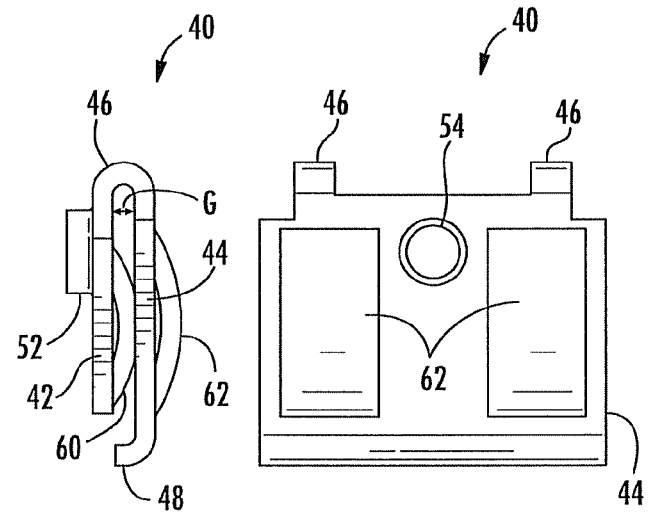

In some embodiments, adapter 40 can have a substantially square or rectangular shape when viewed from the front or rear, as depicted in FIGS. 2B and 2E. In some embodiments for example, the width of front panel 44 and rear panel 42 of adapter 40 can range from about 0.25 inches to about 1.0 inches. In some embodiments, the width of front panel 44 can be greater than the width of rear panel 42, as depicted in FIGS. 2B and 2E. As will be appreciated by one of ordinary skill in the art, the width of front panel 44 and rear panel 42 of adapter 40 can be any desired size without departing from the scope of the presently disclosed subject matter so long as adapter 40 can slidingly engage valve stem bracket 30 on TPM transducer 10. In some embodiments, the height of front panel 44 and rear panel 42 of adapter 40 can range from about 0.4 inches to about 1.0 inch. In some embodiments, the height of front panel 44 and rear panel 42 of adapter 40 can be about 0.4 inches, about 0.5 inches, about 0.6 inches, about 0.7 inches, about 0.8 inches, about 0.9 inches, or about 1.0 inch. In some embodiments, the height of front panel 44 can be about 0.7 inches and rear panel 42 about 0.6 inches. In some embodiments, front panel 44 of adapter 40 can further comprise lip 48 that extends about 0.1 inches below the bottom of rear panel 42 as depicted in FIG. 2D. In some embodiments, the depth or thickness of adapter 40, as viewed from the top in FIG. 2A, can be about 0.1 inches to about 0.4 inches. In some embodiments, the thickness of adapter 40 can be about 0.1 inches, about 0.2 inches, about 0.3 inches or about 0.4 inches.

In some embodiments, the presently disclosed subject matter can comprise a valve stem generally designated 70a, 70b or 70c (also referred to as a tire valve) as depicted in FIGS. 3A, 3B, 3C, 4A, 4B, 4C, 5A, 5B and 5C. Valve stem 70a, 70b or 70c can in some embodiments comprise a rubber valve stem comprising a stem portion 72 (also referred to in the art as an overmold), a base portion 74, a cap 76 and a core element 80 (also referred to in the art as a brass insert). In some embodiments, valve stem 70a, 70b or 70c, and particularly core element 80, can comprise a Schrader valve (not shown). In some embodiments, valve stem 70a, 70b or 70c can be a rubber valve stem as is commonly used in automobile wheel and tire assemblies. As used herein, a "rubber valve stem" refers to a tire valve stem comprising a stem or overmold comprising a rubber or rubber-like material.

Valve stem 70a, 70b or 70c can comprise a plurality of sizes, designs and configurations without departing from the scope of the presently disclosed subject matter. FIGS. 3, 4 and 5 depict three variations of valve stem 70a, 70b or 70c, referenced in FIGS. 3, 4 and 5 as 70a, 70b and 70c, respectively, wherein each varies as to the design and configuration of core element 80. The embodiments of the valve stems depicted in FIGS. 3, 4 and 5 are meant to be exemplary only and not limiting as to the scope of the instant disclosure.

Figure 3A:
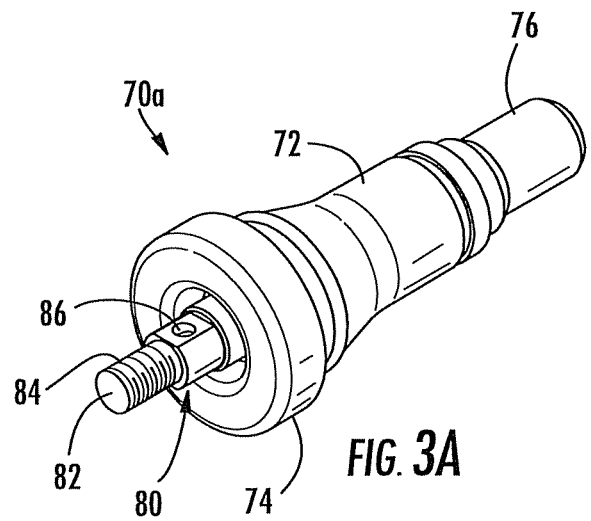
FIGS. 3A, 3B and 3C are illustrations of a valve stem with a core element having an externally threaded end and an air hole perpendicular to the axis of the core element.
Figure 3B:
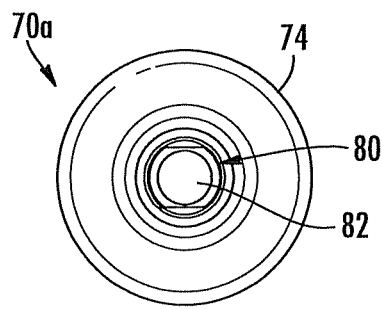
Figure 3C:
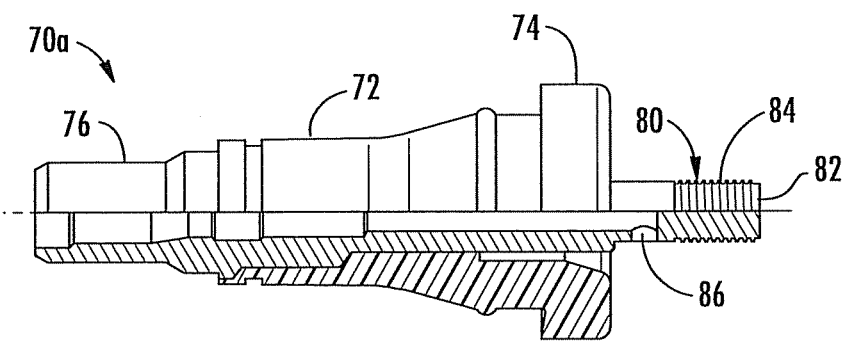

Valve stem generally designated 70a, as illustrated In FIGS. 3A, 3B and 3C, can comprise core element generally designated 80 with an externally threaded 84 terminal end 82 and an air hole 86 that is perpendicular to the axis of core element 80. Externally threaded 84 terminal end 82 of core element 80 can comprise a size and threading suitable for threadingly engaging receiving port 50 of adapter 40 (see FIGS. 2A-2E). Air hole 86 of valve stem 70a provides an inlet and/or outlet for air to travel through valve stem 70a such that, for example, air pressure in a wheel and tire assembly can be regulated.

Figure 4A:
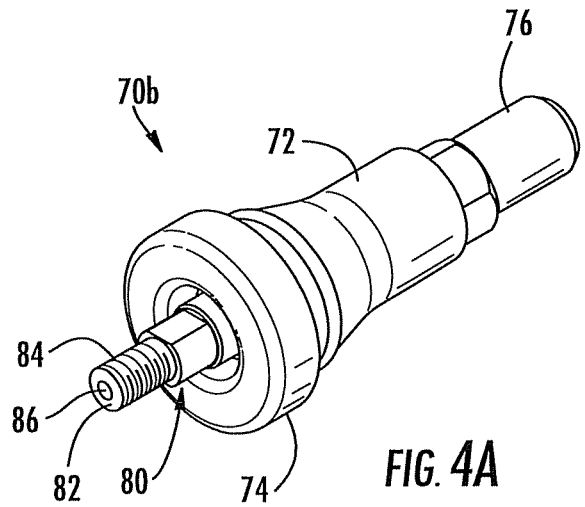
FIGS. 4A, 4B and 4C are illustrations of a valve stem with a core element having an externally threaded end and an air hole parallel to the axis of the core element.
Figure 4B:
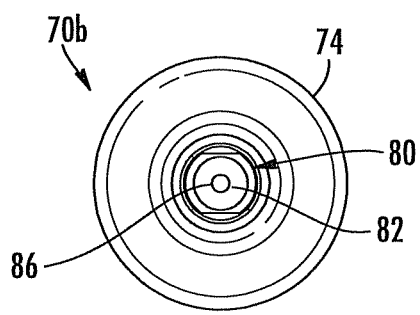
Figure 4C:
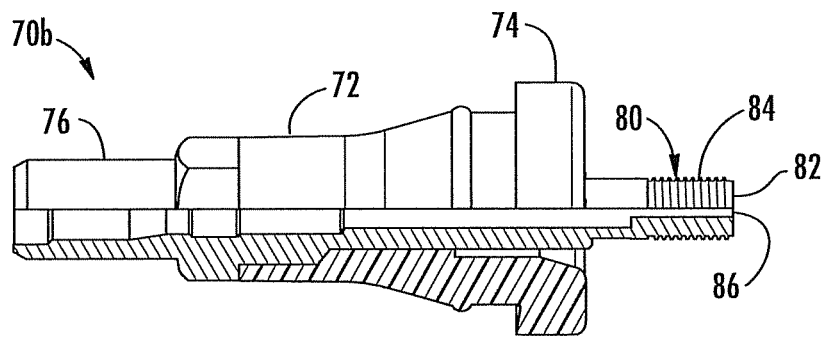

Valve stem generally designated 70b, as illustrated In FIGS. 4A, 4B and 4C, is substantially similar to that depicted in FIGS. 3A, 3B and 3C and discussed above, with the exception of the location and design of air hole 86. Similar to valve stem 70a as depicted in FIGS. 3A, 3B and 3C, valve stem 70b can comprise core element 80 with an externally threaded 84 terminal end 82. Externally threaded 84 terminal end 82 of core element 80 can comprise a size and threading suitable for threadingly engaging receiving port 50 of adapter 40 (see FIGS. 2A-2E). However, in contrast to valve stem 70a as depicted in FIGS. 3A, 3B and 3C, valve stem 70b comprises an air hole 86 that is parallel to the axis of core element 80. Air hole 86 of valve stem 70b extends longitudinally through core element 80 and exits at terminal end 82 as depicted in FIGS. 3A, 3B and 3C. Air hole 86 of valve stem 70b provides an inlet and/or outlet for air to travel through valve stem 70b such that, for example, air pressure in a wheel and tire assembly can be regulated.

Figure 5A:
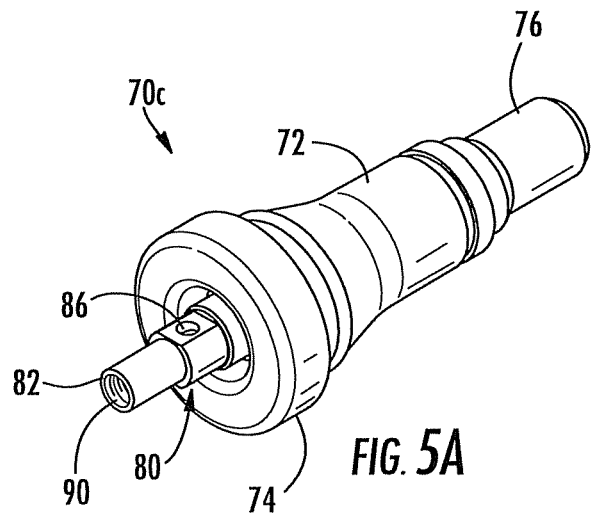
FIGS. 5A, 5B and 5C are illustrations of a valve stem with a core element having an internally threaded end and an air hole perpendicular to the axis of the core element.
Figure 5B:
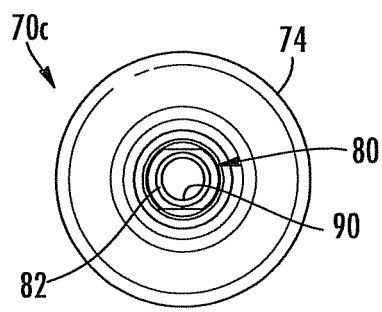
Figure 5C:
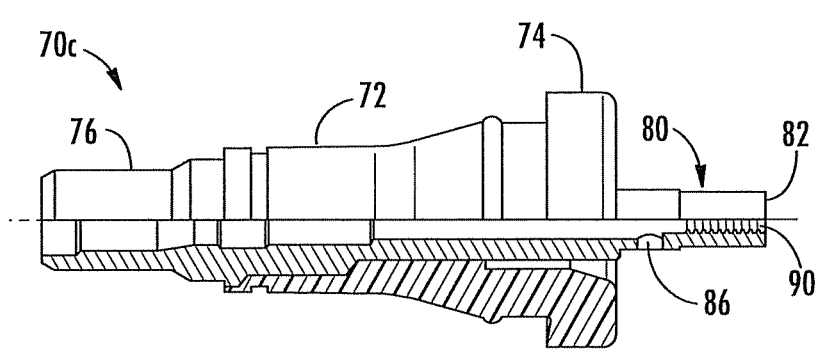

Valve stem generally designated 70c, as illustrated In FIGS. 5A, 5B and 5C, is substantially similar to that depicted in FIGS. 3A, 3B and 3C and discussed above, with the exception of external threading 84 at terminal end 82. Similar to valve stem 70a as depicted in FIGS. 3A, 3B and 3C, valve stem 70c can comprise core element 80 and air hole 86 that is perpendicular to the axis of core element 80. Air hole 86 of valve stem 70c provides an inlet and/or outlet for air to travel through valve stem 70c such that, for example, air pressure in a wheel and tire assembly can be regulated. However, in contrast to valve stem 70a as depicted in FIGS. 3A, 3B and 3C, valve stem 70c comprises an internally threaded cavity 90 at terminal end 82 of core element 80. In some embodiments, internally threaded cavity 90 at terminal end 82 of core element 80 of valve stem 70c is designed to threadingly receive a bolt, screw or other threaded securing mechanism (see screw 100 in FIG. 8 and as discussed further below). Terminal end 82 of valve stem 70c can be a size suitable for passing through receiving port 50 of adapter 40 (see FIGS. 2A-2E) whereby a bolt, screw or other threaded securing mechanism can threadingly engage internally threaded cavity 90 at terminal end 82 of core element 80 such that valve stem 70c is secured to adapter 40 (see FIG. 8 and further discussion below).

In some embodiments, valve stem 70a, 70b or 70c can have an overall length, from the top of cap 76 to the terminal end 82 of core element 80, of about 1 inch to about 3 inches. In some embodiments, valve stem 70a, 70b or 70c can have an overall length of about 1 inch, about 1.5 inches, about 2 inches, about 2.5 inches, or about 3 inches. In some embodiments, valve stem 70a, 70b or 70c can have an overall length of about 2.2 inches. In some embodiments, stem portion 72 of valve stem 70a, 70b or 70c can have a length of about 0.5 inches to about 2.5 inches. In some embodiments, stem portion 72 of valve stem 70a, 70b or 70c can have a length of about 0.5 inches, about 1.0 inches, about 1.5 inches, about 2 inches or about 2.5 inches. In some embodiments, stem portion 72 of valve stem 70a, 70b or 70c can have a length of about 1.2 inches.

Figure 6A:
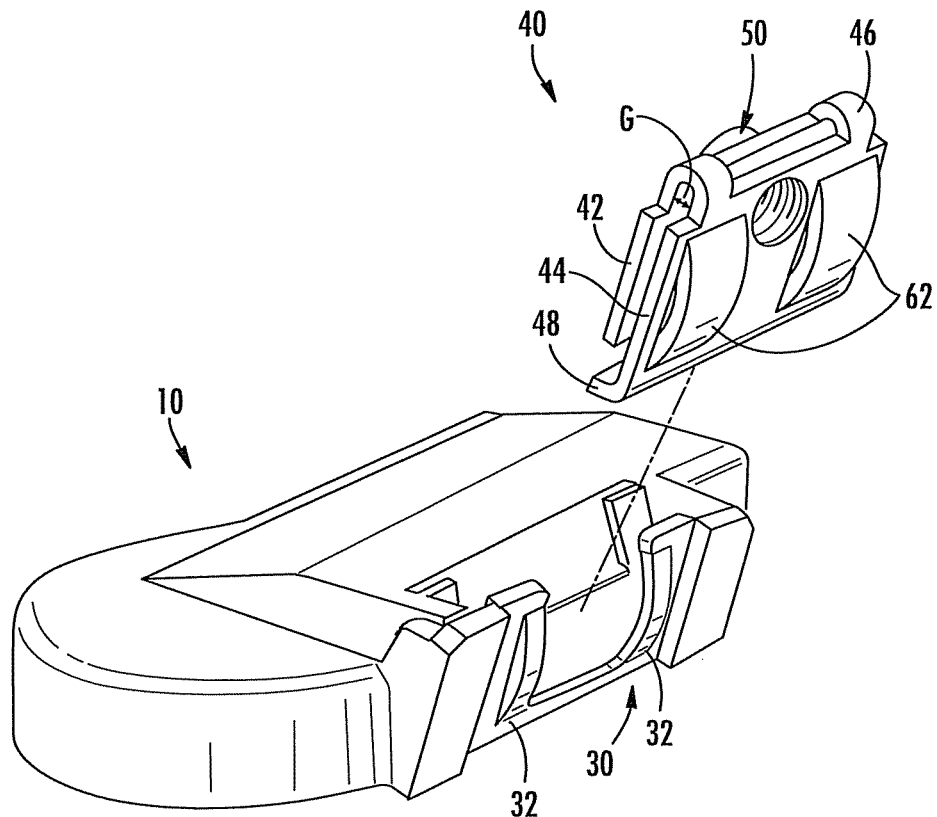
FIGS. 6A, 6B, 6C and 6D are illustrations of a TPM transducer and an adapter of the presently disclosed subject matter.
Figure 6B:
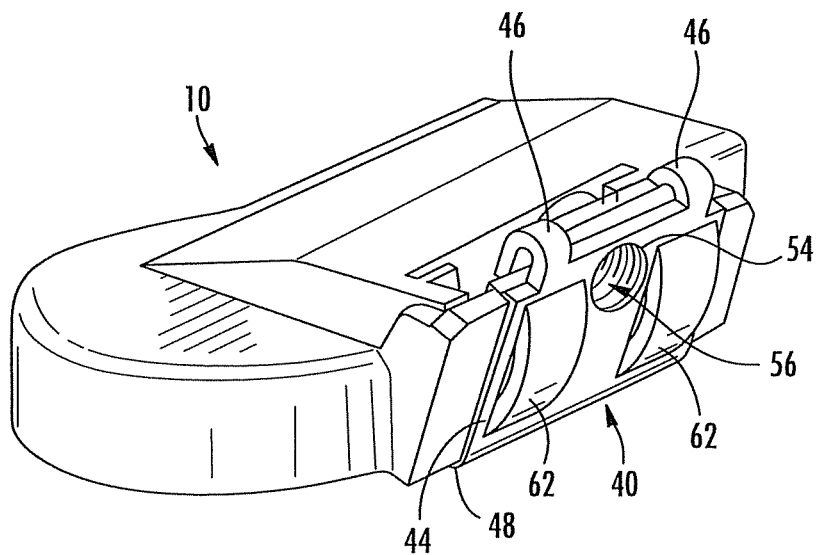
Figure 6C:
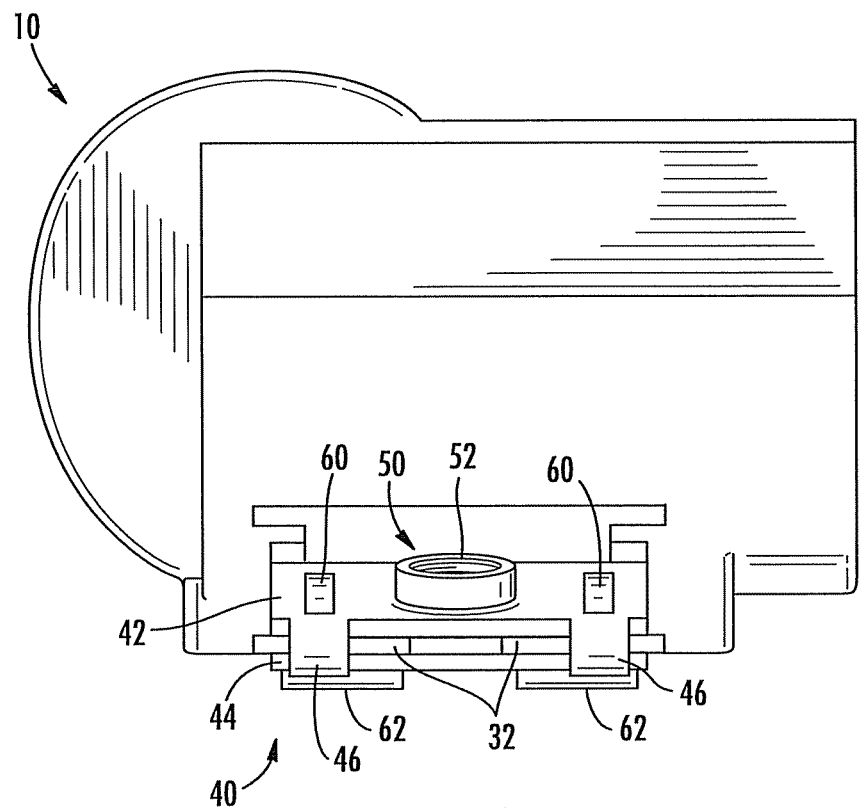
Figure 6D:
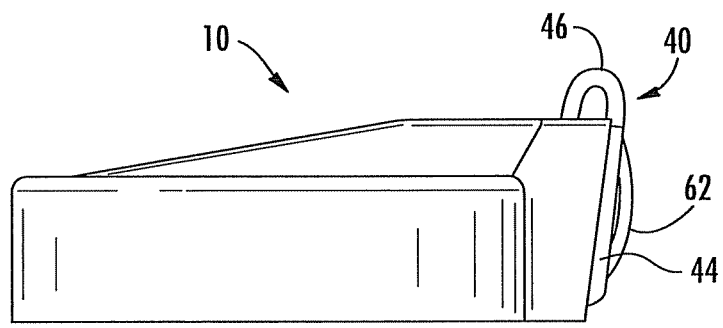

Referring now to FIGS. 6A, 6B, 6C and 6D, illustrations of the assembly of a TPM transducer generally designated 10 and an adapter generally designated 40 of the presently disclosed subject matter are provided. FIG. 6A illustrates TPM transducer 10 and adapter 40 prior to assembly. FIGS. 6B, 6C and 6D illustrate TPM transducer 10 and adapter 40 after assembly. Adapter 40 can be applied to TPM transducer 10 by aligning gap G of adapter 40 with tabs 32 of valve stem bracket 30 and sliding adapter 40 downward. In some embodiments, convex structures 62 on front panel 44 and concave structures 60 on rear panel 42 conform to the contours of tabs 32 of valve stem bracket 30 so as to guide adapter 40 into place on valve stem bracket 30. See FIGS. 6A and 6B. Biasing member 46 of adapter 40 allows for gap G between front panel 44 and rear panel 42 to widen as necessary for adapter 40 to slidingly engage valve stem bracket 30. Upon fully engaging valve stem bracket 30 the bias created by biasing member 46 can return gap G between front panel 44 and rear panel 42 to its original width. That is, adapter 40 (or adaptive clip), with biasing member 46 joining front panel 44 and rear panel 42, can act as a clip that slides onto valve stem bracket 30 and snaps into place. Once adapter 40 is slid into place on valve stem bracket 30, biasing member 46 can apply pressure to valve stem bracket 30 of TPM transducer 10 so as to secure adapter 40 to valve stem bracket 30.

In some embodiments, lip 48 can conform to and abut against the bottom of TPM transducer 10 once adapter 40 is slidingly engaged to TPM transducer 10. Lip 48 can provide a resistive force to prevent adapter 40 from sliding off of valve stem bracket 30 to thereby secure adapter 40 to TPM transducer 10.

Once engaged to TPM transducer 10, adapter 40, by virtue of receiving port 50 suitable for receiving the terminal end 82 of core element 80 of valve stem 70a, 70b or 70c, adapts TPM transducer 10 for use with a valve stem such as valve stem 70a, 70b or 70c depicted in FIGS. 3, 4 and 5. In effect, adapter 40, when applied to TPM transducer 10, converts TPM transducer 10 from a TPM transducer only suitable for use with an aluminum or metal valve stem, such as aluminum or metal valve stem 20 depicted in FIGS. 1A and 1B, into a universal TPM transducer capable of use with a plurality of commonly used valve stems, e.g. rubber valve stems, such as valve stem 70a, 70b or 70c depicted in FIGS. 3, 4 and 5.

Figure 7A:
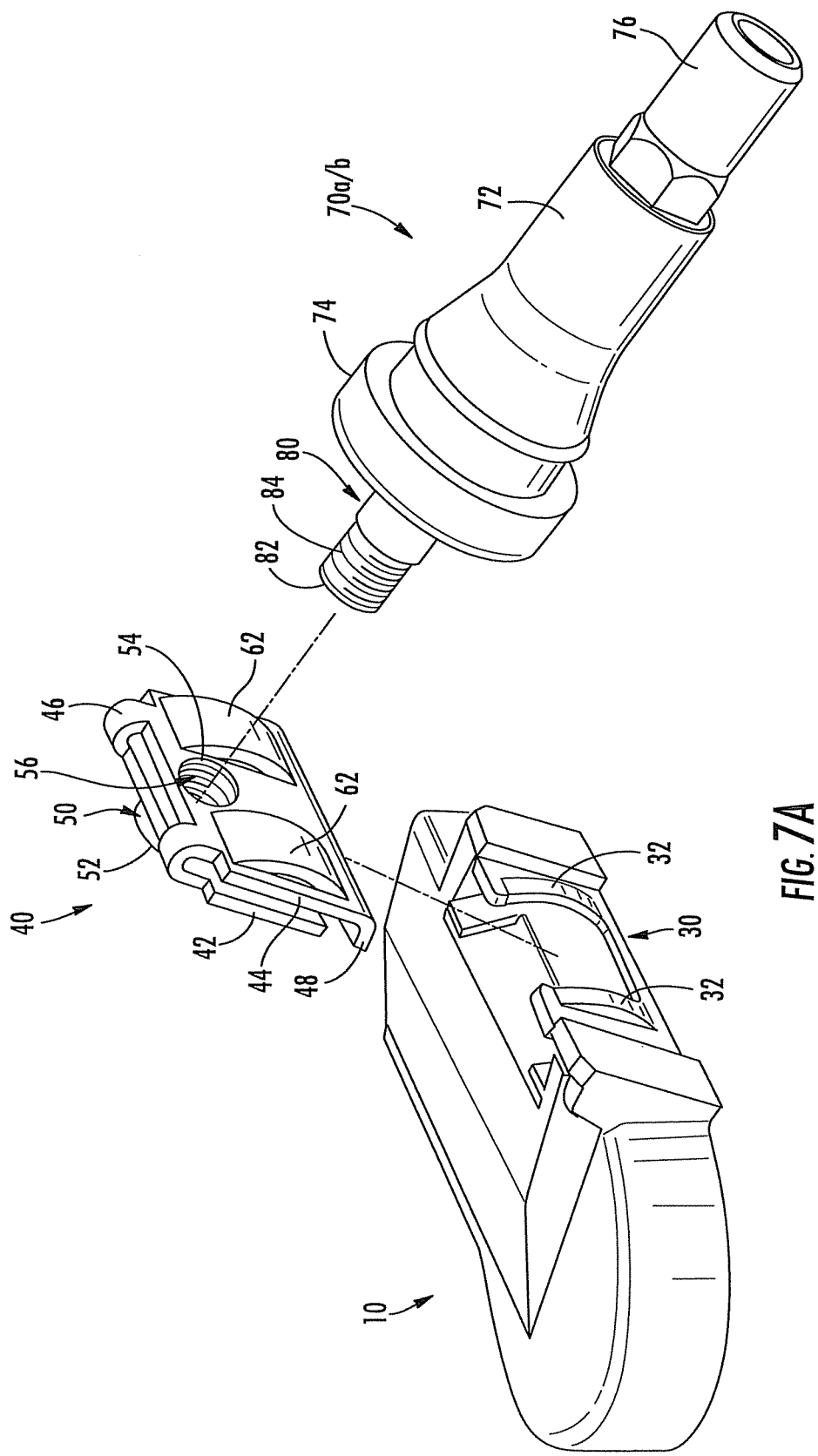

FIGS. 7A and 7B illustrate the use of adapter 40 to adapt TPM transducer 10 for use with valve stem 70a or 70b (referenced as 70a/b in FIGS. 7A and 7B). In some embodiments, adapter 40 can be slidingly engaged to valve stem bracket 30 of TPM transducer 10 as depicted in FIGS. 6A-6D and discussed above. Then, externally threaded 84 terminal end 82 of core element 80 of valve stem 70a or 70b can be threaded into front port 54 of receiving port 50 of adapter 40. Alternatively, in some embodiments valve stem 70a or 70b can be threaded into receiving port 50 of adapter 40 prior to engaging adapter 40 to TPM transducer 10. In either sequence, threading valve stem 70a or 70b into front port 54, by way of rational force, allows externally threaded 84 terminal end 82 of core element 80 to engage internal threads 56 of front port 54 as well as rear port 52, thereby securing valve stem 70a or 70b to TPM transducer 10 by way of adapter 40. In some embodiments, threading core element 80 into both front port 54 as well as rear port 52, particularly where rear port 52 comprises a flange extending perpendicular from the plane of rear panel 42 as illustrated in FIGS. 2C and 2D, provides additional support for securing valve stem 70a or 70b to TPM transducer 10, particularly as compared to only threading core element 80 into front port 54.

FIG. 8 illustrates the use of adapter 40 to adapt TPM transducer 10 for use with valve stem 70c (see FIGS. 5A-5C). In some embodiments, adapter 40 can be slidingly engaged to valve stem bracket 30 of TPM transducer 10 as depicted in FIGS. 6A-6D and discussed above. Then, core element 80 of valve stem 70c can slidingly engage front port 54 of receiving port 50 (with or without internal threads 54) of adapter 40. Alternatively, in some embodiments valve stem 70c can slidingly engage receiving port 50 of adapter 40 prior to engaging adapter 40 to TPM transducer 10. In either sequence, slidingly engaging core element 80 of valve stem 70c into front port 54 allows core element 80 to engage front port 54 as well as rear port 52. Once slid into receiving port 50, screw 100, including a bolt, screw or other threaded securing mechanism as would be appreciated by one of ordinary skill in the art, can threadingly engage internally threaded cavity 90 at terminal end 82 of core element 80 of valve stem 70c from rear port 52 to thereby secure valve stem 70c to TPM transducer 10 by way of adapter 40. In some embodiments, engaging core element 80 with both front port 54 as well as rear port 52, particularly where rear port 52 comprises a flange extending perpendicular from the plane of rear panel 42 as illustrated in FIGS. 2C and 2D, provides additional support for securing valve stem 70c to TPM transducer 10, particularly as compared to only engaging core element 80 with front port 54.

In some embodiments, a tire pressure monitoring apparatus adapter system or kit is provided. The tire pressure monitoring apparatus adapter system or kit can comprise an adapter 40 as disclosed herein and valve stem 70a, 70b or 70c. In some embodiments, valve stem 70a, 70b or 70c in the system or kit is a valve stem not designed to be attached to a given tire pressure monitoring apparatus without the use of adapter 40. The system or kit can further comprising a tire pressure monitoring apparatus 10. The system or kit can further comprise instructions for using adapter 40 for adapting the tire pressure monitoring apparatus 10 for use with valve stem 70a, 70b or 70c provided in the system or kit.

In some embodiments, a method of adapting a tire pressure monitoring apparatus 10 for attaching a valve stem 70a, 70b or 70c is provided. In some embodiments, the method can comprise providing a TPM apparatus 10, wherein TPM apparatus 10 is designed to be used with first valve stem 20, wherein the TPM apparatus 10 comprises a valve stem bracket 30 for attaching first valve stem 20. The method can further comprise a step of providing an adapter 40, wherein adapter 40 comprises a first planar structure 44 and a second planar structure 42 joined together by a biasing member 46, whereby the first and second planar structures are vertically aligned with respect to one another and spaced apart sufficiently to allow for valve stem bracket 30 of TPM apparatus 10 to slidingly engage adapter 40, and a receiving port 50 comprising a circular opening sufficient for receiving a terminal end 80 of a second valve stem 70a, 70b or 70c. The method can further comprise providing a second valve stem 70a, 70b or 70c comprising a terminal end 82 of a core element 80, wherein second valve 70a, 70b or 70c stem is not designed to be attached to the TPM apparatus 10 without the use of adapter 40. The method can further comprise a step of engaging adapter 40 to TPM apparatus 10, whereby adapter 40 provides for the attachment of second valve stem 70a, 70b or 70c to TPM apparatus 10.

In some embodiments of the method of adapting a TPM apparatus 10 for attaching a valve stem 70a, 70b or 70c, TPM apparatus 10 is a pressure transducer. In some embodiments, first valve stem 20 is an aluminum or metal valve stem. In some embodiments, second valve stem 70a, 70b or 70c is a rubber valve stem. In some embodiments, the rubber valve stem is not designed to be attached to TPM apparatus 10 without the use of adapter 40. It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An adapter for attaching a valve stem to a tire pressure monitoring apparatus, the adapter comprising:
    a first structure and a second structure joined together by a biasing member, whereby the first and second structures are vertically aligned with respect to one another and spaced apart sufficiently to allow for a valve stem bracket of a tire pressure monitoring apparatus to slidingly engage the adapter; and
    a receiving port comprising an opening sufficient for receiving a terminal end of a valve stem,
    whereby the adapter engages a tire pressure monitoring apparatus to attach a valve stem to the pressure monitoring apparatus.

2. The adapter of claim 1, wherein the tire pressure monitoring apparatus is a pressure transducer.

3. The adapter of claim 2, wherein the pressure transducer is configured for use with a first valve stem.

4. The adapter of claim 3, wherein the first valve stem is an aluminum or metal valve stem.

5. The adapter of claim 3, wherein the valve stem bracket of the pressure transducer is configured to engage the first valve stem.

6. The adapter of claim 3, wherein a second valve stem is attached to the pressure transducer when the adapter is engaged to the pressure transducer.

7. The adapter of claim 6, wherein the second valve stem is a rubber valve stem.

8. The adapter of claim 1, wherein the valve stem is a rubber valve stem, wherein the adapter is configured to engage the rubber valve stem to thereby engage the rubber valve stem to the tire pressure monitoring apparatus.

9. The adapter of claim 1, wherein the receiving port comprises an opening in each of the first and second panels, wherein the openings are aligned such that the terminal end of the valve stem is passable through both openings.

10. The adapter of claim 9, wherein the receiving port further comprises internal threading, wherein a threaded terminal end of the valve stem is threadably receivable in the internal threading.

11. The adapter of claim 9, wherein the terminal end of the valves stem is passable through the receiving port, wherein a screw is threadably receivable in a threaded cavity in the terminal end of the valve stem, whereby the valve stem is secured to the adapter.

12. The adapter of claim 1, wherein the adapter comprises a material selected from the group consisting of a polymer, a plastic, a composite, a metal, an alloy, and combinations thereof.

13. A tire pressure monitoring apparatus adapter system, comprising:
    an adapter comprising a first planar structure and a second planar structure joined together by a biasing member, whereby the first and second planar structures are vertically aligned with respect to one another and spaced apart sufficiently to allow for a valve stem bracket of a tire pressure monitoring apparatus to slidingly engage the adapter, and a receiving port comprising a circular opening sufficient for receiving a terminal end of a valve stem, whereby the adapter is suitable for engaging a tire pressure monitoring apparatus to thereby provide for the attachment of a valve stem to the pressure monitoring apparatus; and
    a valve stem comprising a terminal end, wherein the adapter engages the valve stem to thereby engage the valve stem to the tire pressure monitoring apparatus.

14. The tire pressure monitoring apparatus adapter system of claim 13, further comprising a tire pressure monitoring apparatus.

15. The tire pressure monitoring apparatus adapter system of claim 14, wherein the tire pressure monitoring apparatus is a transducer.

16. A method of adapting a tire pressure monitoring apparatus for attaching a valve stem, comprising;
    providing a tire pressure monitoring apparatus, the tire pressure monitoring apparatus comprising a transducer, wherein the transducer is configured for use with a first valve stem, wherein the transducer comprises a valve stem bracket for attaching the first valve stem;
    providing an adapter, wherein the adapter comprises a first planar structure and a second planar structure joined together by a biasing member, whereby the first and second planar structures are vertically aligned with respect to one another and spaced apart sufficiently to allow for a valve stem bracket of a tire pressure monitoring apparatus to slidingly engage the adapter, and a receiving port comprising a circular opening sufficient for receiving a terminal end of a second valve stem;
    providing a second valve stem comprising a terminal end, wherein the adapter engages the second valve stem; and
    engaging the adapter to the tire pressure monitoring apparatus, whereby the adapter provides for the attachment of the second valve stem to the pressure monitoring apparatus.

17. The method of claim 16, wherein the tire pressure monitoring apparatus is a pressure transducer.

18. The method of claim 16, wherein the first valve stem is an aluminum or metal valve stem.

19. The method of claim 16, wherein the second valve stem is a rubber valve stem.

20. The method of claim 19, wherein the adapter engages the rubber valve stem to thereby engage the rubber valve stem to the tire pressure monitoring apparatus.

21. The method of claim 16, wherein the second valve stem is secured to the adapter by receiving the terminal end of the second valve stem through the receiving port.

* * * * *